(12) United States Patent
Rainous et al.

(10) Patent No.: US 7,992,823 B2
(45) Date of Patent: Aug. 9, 2011

(54) ICE SHED REDUCTION FOR LEADING EDGE STRUCTURES

(75) Inventors: Edward Atwood Rainous, Cincinnati, OH (US); Barry Lynn Allmon, Maineville, OH (US); Jeffre Gerry Loewe, Cincinnati, OH (US); William Clarke Brooks, Lebanon, OH (US); Lee Alan Blanton, Cincinnati, OH (US); Courtney James Tudor, Cincinnati, OH (US); Vicky Showalter Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 627 days.

(21) Appl. No.: 12/112,660

(22) Filed: Apr. 30, 2008

(65) Prior Publication Data
US 2009/0272095 A1 Nov. 5, 2009

(51) Int. Cl.
*B64D 15/00* (2006.01)
(52) U.S. Cl. ....... 244/134 E; 252/70; 106/13; 106/14.12
(58) Field of Classification Search ............... 244/134 E, 244/134 R; 252/70; 106/13, 14.12; 60/39.093
See application file for complete search history.

(56) References Cited

U.S. PATENT DOCUMENTS

| | | | |
|---|---|---|---|
| 2,385,662 A | 9/1945 | Bernard | |
| 3,173,491 A | 3/1965 | Jusyk | |
| 3,794,444 A | 2/1974 | Campbell et al. | |
| 4,129,984 A | 12/1978 | Nelson | |
| 4,650,138 A | 3/1987 | Grose | |
| 5,763,249 A | 6/1998 | Schultz et al. | |
| 6,084,020 A | 7/2000 | Smith et al. | |
| 6,120,849 A | 9/2000 | Smith et al. | |
| 6,171,704 B1 | 1/2001 | Mosser et al. | |
| 6,362,135 B1 | 3/2002 | Greer | |
| 6,797,795 B2 | 9/2004 | Byrd | |
| 6,809,169 B2 | 10/2004 | Byrd et al. | |
| 6,835,322 B2 | 12/2004 | Yoshida et al. | |
| 7,202,321 B2 * | 4/2007 | Byrd et al. | 528/26 |
| 2003/0035719 A1 | 2/2003 | Wadia et al. | |
| 2004/0065092 A1 | 4/2004 | Wadia et al. | |
| 2006/0281861 A1 | 12/2006 | Putnam | |
| 2008/0061266 A1 * | 3/2008 | Koefod | 252/70 |
| 2009/0294724 A1 * | 12/2009 | Attar | 252/70 |

FOREIGN PATENT DOCUMENTS

| | | |
|---|---|---|
| GB | 458862 | 12/1936 |
| WO | 2004078873 | 9/2004 |
| WO | 2006024032 | 3/2006 |

OTHER PUBLICATIONS

International Search Report issued in connection with corresponding PCT Application No. PCT/US2009/035518 on May 6, 2010.

* cited by examiner

*Primary Examiner* — Christopher P Ellis
(74) *Attorney, Agent, or Firm* — Trego, Hines & Ladenheim, PLLC

(57) ABSTRACT

A leading edge structure for use in an aerospace vehicle includes a body having a flowpath surface which defines a leading edge adapted to face an air flow during operation; and a metallic icephobic plating comprising nickel applied to at least a portion of the flowpath surface.

11 Claims, 5 Drawing Sheets

ICE SHED REDUCTION FOR LEADING EDGE STRUCTURES

BACKGROUND OF THE INVENTION

This invention relates generally to aerospace vehicle structures and more particularly to materials and designs for improving ice shedding characteristics from such structures.

All aircraft include various "leading edge structures", i.e. exposed surfaces that face the direction of flight. These surfaces include, for example, parts of the fuselage, wings, control surfaces, and powerplants.

One common type of aircraft powerplant is a turbofan engine, which includes a turbomachinery core having a high pressure compressor, combustor, and high pressure turbine in serial flow relationship. The core is operable in a known manner to generate a flow of propulsive gas. A low pressure turbine driven by the core exhaust gases drives a fan through a shaft to generate a propulsive bypass flow. The low pressure turbine also drives a low pressure compressor or "booster" which supercharges the inlet flow to the high pressure compressor.

Certain flight conditions allow for ice build up on the leading edge structures, and, in particular, the fan and booster flowpath areas of the engine. These areas include the blades, spinner cone, and static vane and fairing leading edges. The FAA requires certification testing at these flight points to demonstrate the ability to maintain engine thrust once the ice sheds from the various components and ingests into the engine.

One particular leading edge structure of interest is the engine's fan splitter. The splitter is an annular ring with an airfoil leading edge that is positioned immediately aft of the fan blades. Its function is to separate the airflow for combustion (via the booster) from the bypass airflow. It is desired for the splitter and other leading edge structures to have mechanical, chemical, and thermal properties such that ice build up and shed volume is minimized during an icing event. This in turn minimizes risk of compressor stall and compressor mechanical damage from the ingested ice.

Prior art turbofan engines have splitters made from titanium, which is known to provide favorable ice shed properties. The downside of titanium is the expense and weight when compared to conventionally treated aluminum. However, aluminum is believed to behave poorly in an aircraft icing environment. Examples of conventional treatments for aluminum include but are not limited to chemical conversion coatings and anodizing.

Leading edge structures can also be protected with known coatings that are referred to as "icephobic" or "anti-ice" coatings, for example, polyurethane paint or other organic coatings. These coatings have the effect of lowering adhesion forces between ice accretions and the protected component. While these coatings can improve ice shedding characteristics, their erosion resistance may be not adequate to protect leading edge structures from the scrubbing effect of airflows with entrained abrasive particles which are encountered in flight.

BRIEF SUMMARY OF THE INVENTION

These and other shortcomings of the prior art are addressed by the present invention, which provides components having icephobic plating that reduces and/or modifies ice adhesion forces to promote ice release and reduce shedding of large ice pieces.

According to one aspect, the invention provides a leading edge structure for use in an aerospace vehicle, including: (a) a body having a flowpath surface which defines a leading edge adapted to face an air flow during operation; and (b) a metallic icephobic plating comprising nickel applied to at least a portion of the flowpath surface.

According to another aspect of the invention, a splitter for a turbofan engine includes: (a) an annular body having a flowpath surface which defines a leading edge adapted to face an air flow during operation; and (b) a metallic icephobic plating comprising nickel applied to a least a portion of the flowpath surface.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
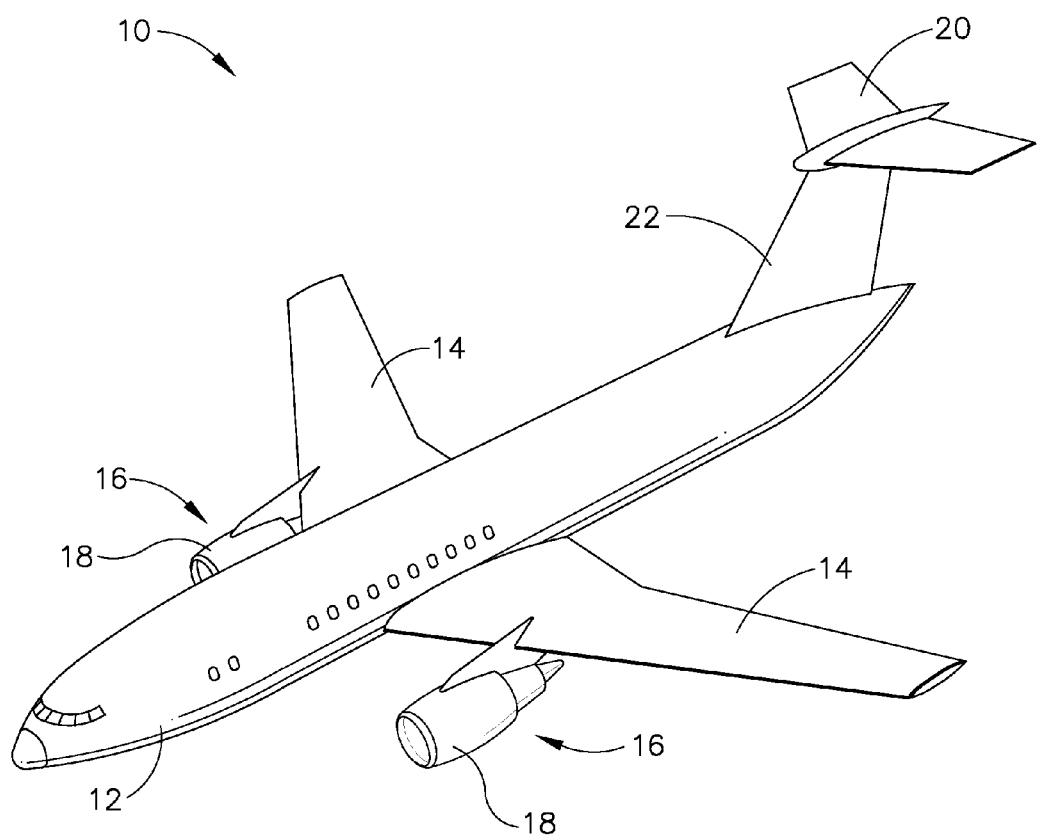
FIG. 1 is a perspective view of an aircraft powered by a pair of high-bypass turbofan engines, incorporating icing-resistant components constructed according to an aspect of the present invention.

Referring to the drawings wherein identical reference numerals denote the same elements throughout the various views, FIG. 1 depicts a known type of commercial aircraft 10 which includes a generally tubular fuselage 12, wings 14 carrying turbofan engines 16 mounted in nacelles 18, and an empennage comprising horizontal and vertical stabilizers 20 and 22. Each of these components includes one or more exposed surfaces having a curved or airfoil-like cross-section that faces the direction of flight (in other words, an aerodynamic leading edge). These components are referred to herein as "leading edge structures". While the present invention will be described further in the context of a gas turbine engine, it will be understood that the principles contained therein may be applied to any type of leading edge structure.

Figure 2:
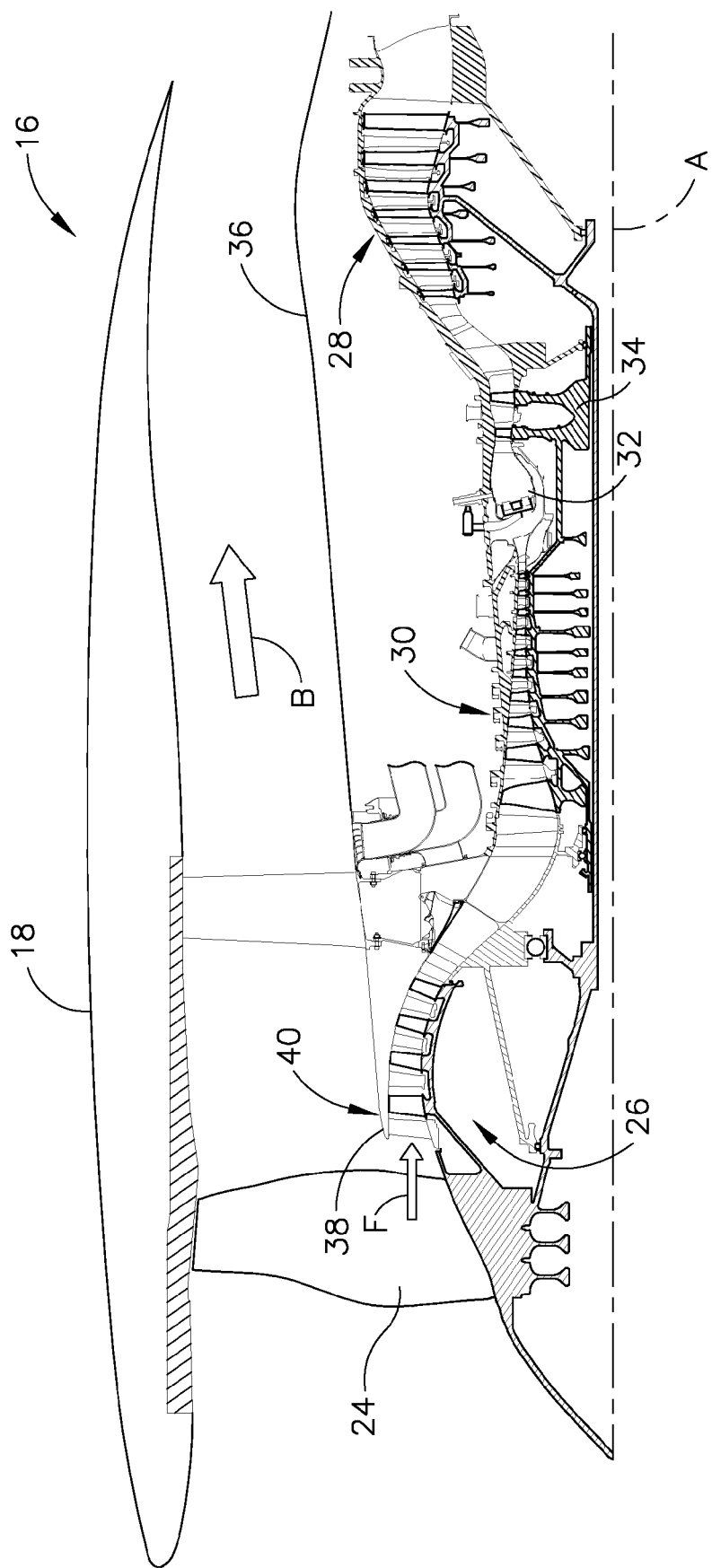
FIG. 2 is a schematic half cross-sectional view of an engine shown in FIG. 1.

As shown in FIG. 2, the engine 16 has a longitudinal axis "A" and includes conventional components including a fan 24, a low pressure compressor or "booster" 26 and a low pressure turbine ("LPT") 28, collectively referred to as a "low pressure system", and a high pressure compressor ("HPC") 30, a combustor 32, and a high pressure turbine ("HPT") 34, collectively referred to as a "gas generator" or "core", various components of the nacelle 18, and stationary structures of the engine 16, including a core nacelle 36, cooperate to define a core flowpath marked with an arrow "F", and a bypass duct marked with an arrow "B".

A stationary annular splitter 38 is positioned at the forward end of the core nacelle 36, between the bypass duct B and the core flowpath F. The splitter 38 may be a single continuous ring, or it may be built up from arcuate segments. While a variety of materials such as metal alloys and composites may be used, the splitter 38 is preferably constructed from an aluminum alloy to reduce weight and expense. For example, an aluminum-alloy splitter may have a lower weight and cost than a comparable titanium splitter. Various aluminum alloys and tempers are known for use in aerospace applications, and the particular alloy used for the splitter 38 is not critical so long as it has acceptable mechanical properties for the particular application (e.g. strength, fatigue resistance, corrosion resistance, etc.) One example of an alloy known to be suitable for constructing the splitter 38 is AL7075.

Figure 3:
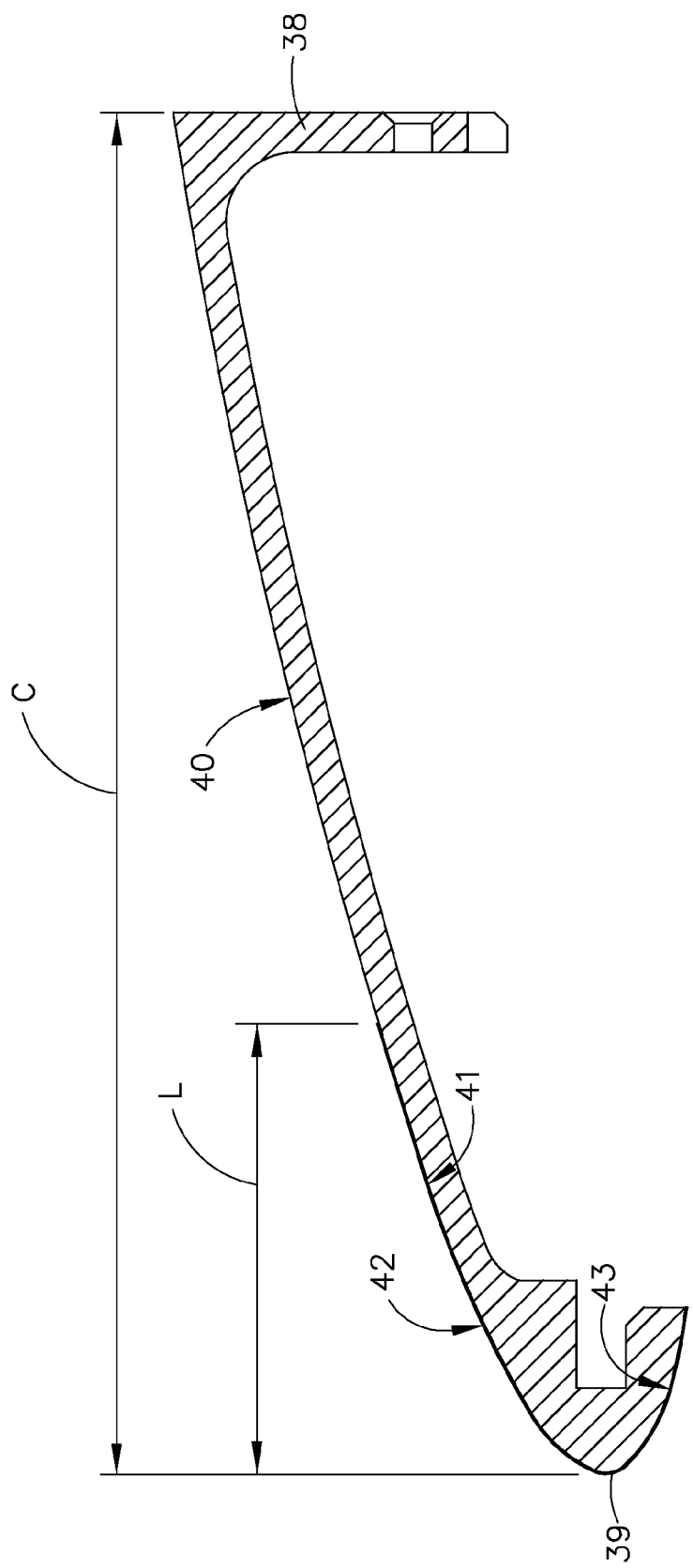
FIG. 3 is a half-sectional view of a splitter shown in FIG. 2.

As shown in FIG. 3, the flowpath surface 40 of the splitter 38 includes a radially-outward-facing portion 41 and a radially-inward-facing portion 43. The two portions are demarcated by an aerodynamic leading edge 39. The splitter 38 is an example of a leading edge structure as described above. At least a portion of the flowpath surface 40 has a metallic plating 42 applied thereto which has "icephobic" properties, that is, very low adhesion forces are generated between the plating 42 and any ice that forms thereon, as compared to the base material of the splitter 38. The plating 42 is depicted with an exaggerated heavy line solely for the purposes of illustration. In the illustrated example, the splitter 38 has a chord length "C" in the axial direction of about 8.9 cm (3.5 in.). The exact dimensions are not critical and will vary with a particular application. The length of the flowpath surface 40 which is plated is denoted "L" in FIG. 3. The splitter 38 may be completely plated, in which case the length L would be 100% of the chord length C. However, in operation, ice typically does not cover the splitter 38 to this extent. Accordingly, the plating 42 may be restricted to any shorter length, which need not correspond to the extent of expected ice coverage. A practical example of an expected shorter length L is about 2% to about 20% of the chord length C. The radially inward-facing portion 43 of the flowpath surface 40 may be completely covered regardless of the extent of coverage on the radially-outward facing portion 41.

An example of a suitable icephobic metallic plating is nickel or a nickel alloy. One example of a known suitable nickel plating process is electroless nickel plating as described in AMS2404. In general, the smoother the surface finish of the plating 42, the lower the ice adhesion forces are expected to be. Porosity of the plating 42 should be minimized to avoid corrosion and ice adhesion. Addition of phosphorous and/or boron in combined amounts of up to about 25% by weight may be helpful in reducing porosity. Use of a "high phosphorous" plating containing about 10% to about 13% percent by weight is known to minimize porosity of a nickel plating applied to aluminum.

In this example, the finished plating has a thickness of about 0.04 mm (0.0015 in.) to about 0.15 mm (0.0060 in.). The thickness is not critical for icing reduction purposes, so long as the underlying substrate is not exposed (i.e. the plating is continuous) Component testing has demonstrated that nickel plating of this thickness provides erosion resistance comparable to a titanium part, and is suitable for use in a gas turbine engine. The thickness is only important for achieving desired durability and expected service life for the component.

In operation, the engine 10 will be exposed to icing conditions, namely the presence of moisture in temperatures near the freezing point of water. Ice will naturally tend to form on the leading edge structures including the splitter 38. As the ice mass builds up, it protrudes into the air flow and increasing aerodynamic (drag) forces act on it, eventually causing portions of it to shed from the splitter 38. With the plating 42 described above, adhesion forces between the ice and the splitter 38 are substantially reduced as compared to conventionally treated aluminum and titanium. The result is that pieces of the ice break off and shed downstream when they are a smaller size than would otherwise be the case. This avoids excessive cooling and foreign object damage in the high pressure compressor 30.

In addition to lowering overall ice adhesion forces, it is also possible to improve ice shedding properties by varying the ice adhesion forces over the surface of the component. Specifically, by providing different sections of the splitter 38 or other leading edge structure with varying adhesion properties, stresses are generated within the ice itself as aerodynamic forces act on it. This causes the ice to break up into smaller pieces and in a more predictable fashion that if it were to shed naturally.

Figure 4:
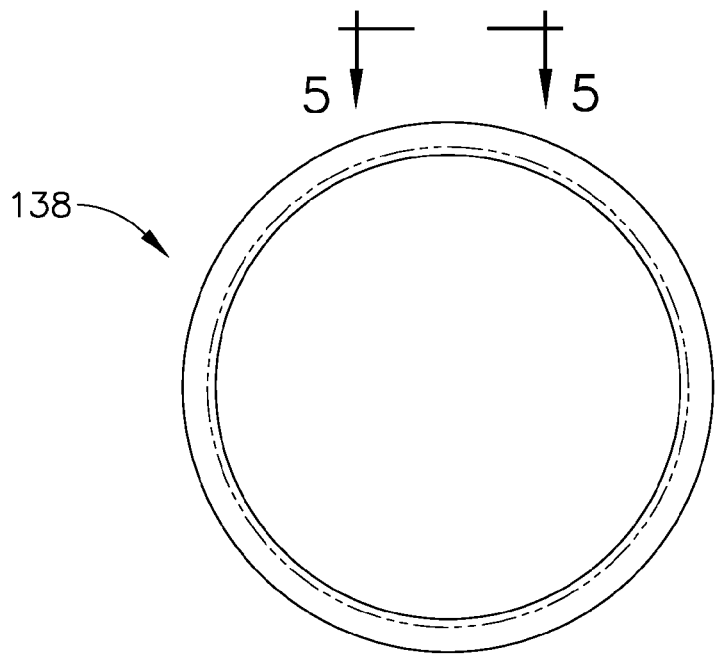
FIG. 4 is a view taken from forward looking aft at an alternative splitter.
Figure 5:
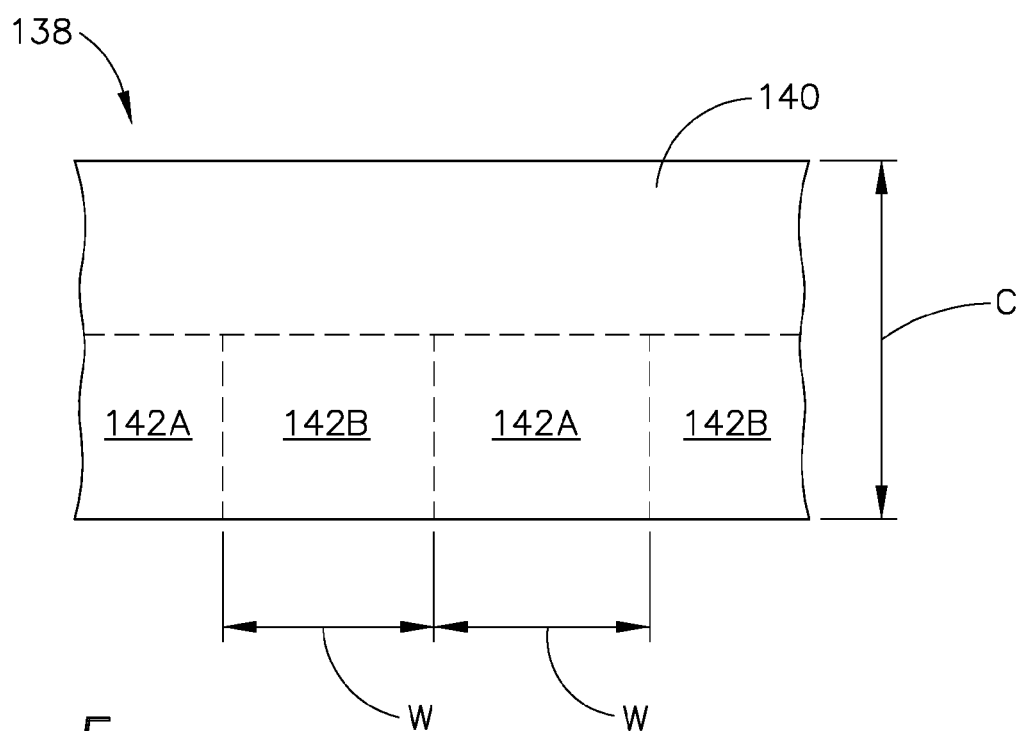
FIG. 5 is a view taken along lines 5-5 of FIG. 4.

For example, FIGS. 4 and 5 show an alternative splitter 138 similar in construction to the splitter 38 described above. The flowpath surface 140 is "sectored" into separate surface areas in the circumferential direction. Areas 142A have a metallic icephobic plating as described above, while the alternate areas 142B have a coating or surface treatment, or are otherwise prepared so as to present a different ice-adhesion property (i.e. substantially greater or lesser adhesion than the plated areas 142A). The boundaries between the different areas may be straight or curved, and may have varying alignments. Examples of materials for the alternate areas 142B would include conventionally treated aluminum, a different metallic plating, organic coatings (e.g. polyurethane or epoxy paints), polytetrafluoroethylene (PTFE), etc. For practical purposes a suitable erosion-protective material should be used. The width "W" of the areas 142A and 142B in the circumferential direction may be selected to cause ice to breakup into relatively small pieces.

Figure 6:
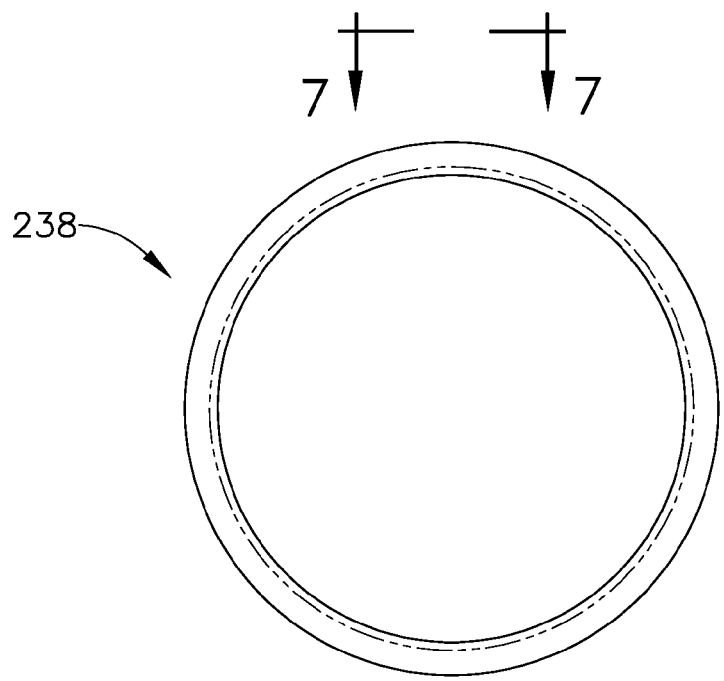
FIG. 6 is a view taken from forward looking aft at another alternative splitter.
Figure 7:
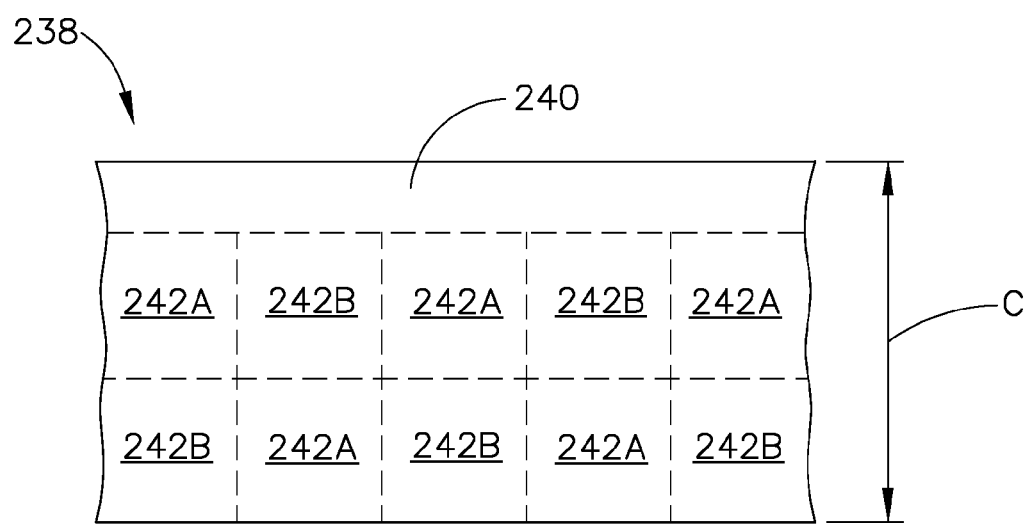
FIG. 7 is a view taken along lines 7-7 of FIG. 6.

FIGS. 6 and 7 show another alternative splitter 238. Like the splitter 138, the flowpath surface 240 is divided into areas 242A with metallic icephobic plating as described above, and alternate areas 242B with different ice adhesion properties. The boundaries between the different areas may be straight or curved, and may have varying alignments. In this example, the flowpath surface 240 is divided in both the circumferential and axial directions. As this example shows, any suitable combination of circumferential, axial, and/or radial sectoring may be used to reduce ice shed size.

The foregoing has described materials and designs for ice shed reduction in aerospace structures. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only.

What is claimed is:

1. A leading edge structure for use in an aerospace vehicle, comprising:
   (a) a body comprising having a flowpath surface which defines a leading edge adapted to face an air flow during operation, wherein the flowpath surface comprises:
      (i) a plurality of first areas having an icephobic metallic plating comprising nickel applied thereto, the first areas having a first ice adhesion characteristic; and
      (ii) a plurality of second areas having a second ice adhesion characteristic substantially different from the first ice adhesion characteristic.

2. The leading edge structure of claim 1 wherein the body comprises aluminum.

3. The leading edge structure of claim 1 wherein the plating includes phosphorous.

4. The leading edge structure of claim 3 wherein the plating consists essentially of about 75% nickel by weight, with the balance being phosphorus, boron, and incidental impurities.

5. The leading edge structure of claim 1 wherein the plating is about 0.0015 inches to about 0.006 inches thick.

6. The leading edge structure of claim 1 wherein the flowpath surface includes a radially-inward-facing portion and a radially-outward-facing portion, and wherein the plating covers about 2% to about 20% of a chord length of the radially-outward-facing portion.

7. An annular splitter for a gas turbofan engine comprising the leading edge structure of claim 1.

8. The leading edge structure of claim 1 wherein the flowpath surface is divided along more than one axis to define the first and second areas.

9. The leading edge structure of claim 1 wherein the second areas are coated with an organic or conversion coating.

10. The leading edge structure of claim 1 wherein the flowpath surface is sectored in a circumferential direction to define the first and second areas.

11. The leading edge structure of claim 1 wherein the flowpath surface is sectored in an axial direction to define the first and second areas.

* * * * *